(12) United States Patent
Mattes

(10) Patent No.: US 7,931,462 B2
(45) Date of Patent: Apr. 26, 2011

(54) DEVICE AND METHOD FOR THE MANUFACTURING OF A THREE-DIMENSIONAL OBJECT

(75) Inventor: Thomas Mattes, Gilching (DE)

(73) Assignee: EOS GmbH Electro Optical Systems, Krailling (DE)

(*) Notice: Subject to any disclaimer, the term of this patent is extended or adjusted under 35 U.S.C. 154(b) by 0 days.

(21) Appl. No.: 11/994,147

(22) PCT Filed: Apr. 25, 2007

(86) PCT No.: PCT/EP2007/003640
§ 371 (c)(1), (2), (4) Date: Dec. 28, 2007

(87) PCT Pub. No.: WO2007/134687
PCT Pub. Date: Nov. 29, 2007

(65) Prior Publication Data
US 2008/0203621 A1 Aug. 28, 2008

(30) Foreign Application Priority Data
May 18, 2006 (DE) .......................... 10 2006 023 485

(51) Int. Cl.
*B29C 35/08* (2006.01)
*B29C 41/02* (2006.01)
*B29C 41/52* (2006.01)

(52) U.S. Cl. ...................... 425/375; 425/174.4; 264/308; 264/497; 264/113; 264/401; 118/679

(58) Field of Classification Search .................. 425/215, 425/174.4, 375; 264/497, 308, 401, 113; 118/679
See application file for complete search history.

(56) References Cited

U.S. PATENT DOCUMENTS

| 5,658,412 | A | * | 8/1997 | Retallick et al. ........... 156/272.8 |
| 5,730,925 | A | * | 3/1998 | Mattes et al. ................. 264/497 |
| 5,980,812 | A | * | 11/1999 | Lawton ......................... 264/401 |
| 6,030,199 | A | * | 2/2000 | Tseng ........................... 425/132 |
| 6,042,774 | A | * | 3/2000 | Wilkening et al. ............. 264/497 |
| 6,136,257 | A | * | 10/2000 | Graf et al. ...................... 264/460 |
| 6,764,636 | B1 | * | 7/2004 | Allanic et al. ................. 264/401 |
| 7,048,530 | B2 | | 5/2006 | Gaillard |
| 7,458,800 | B2 | * | 12/2008 | Scherer et al. ................ 425/413 |
| 7,713,048 | B2 | * | 5/2010 | Perret et al. ................... 425/143 |

(Continued)

FOREIGN PATENT DOCUMENTS
DE 195 14 740 C1 4/1996
(Continued)

*Primary Examiner* — Joseph S Del Sole
*Assistant Examiner* — Nahida Sultana
(74) *Attorney, Agent, or Firm* — McDonnell Boehnen Hulbert & Berghoff LLP

(57) ABSTRACT

A device for manufacturing a three-dimensional object by a layerwise solidification of a building material in powder form at the positions in the respective layer that correspond to the object to be manufactured is provided. A work plane (4) is provided, in which successively layers of the building material in powder form, which are to be solidified, are applied and are partially solidified. An application device (5) for applying a layer of the building material in the work plane or onto a previously solidified layer of the building material has an application surface (53) facing the work plane (4). An adjustment device (59, 60, 54) is provided that is constructed such that an angle ($\alpha$) between the application surface (53) and the work plane (4) is adjustable.

17 Claims, 2 Drawing Sheets

U.S. PATENT DOCUMENTS

| | | | | |
|---|---|---|---|---|
| 7,713,454 B2* | 5/2010 | Larsson | | 264/40.6 |
| 2004/0104499 A1* | 6/2004 | Keller | | 264/40.6 |
| 2004/0170765 A1 | 9/2004 | Ederer et al. | | |
| 2005/0183460 A1* | 8/2005 | Takahara | | 65/377 |
| 2005/0263932 A1* | 12/2005 | Heugel | | 264/113 |
| 2006/0119012 A1* | 6/2006 | Ruatta et al. | | 264/497 |
| 2007/0001342 A1* | 1/2007 | Oberhofer et al. | | 264/237 |
| 2007/0074659 A1* | 4/2007 | Wahlstrom | | 118/679 |
| 2007/0075459 A1* | 4/2007 | Reynolds et al. | | 264/401 |
| 2008/0128956 A1* | 6/2008 | Perret | | 264/497 |
| 2008/0131104 A1* | 6/2008 | Philippi | | 392/407 |
| 2009/0045553 A1* | 2/2009 | Weidinger et al. | | 264/497 |
| 2009/0206522 A1* | 8/2009 | Hein et al. | | 264/497 |
| 2009/0255912 A1* | 10/2009 | Dietrich | | 219/121.86 |
| 2010/0156003 A1* | 6/2010 | Wahlstrom | | 264/401 |

FOREIGN PATENT DOCUMENTS

| | | |
|---|---|---|
| DE | 19514740 C1 | 4/1996 |
| WO | WO 01 41939 | 4/2001 |
| WO | 01/41939 A1 | 6/2001 |
| WO | 02/083323 A2 | 10/2002 |
| WO | WO 02 083323 A | 10/2002 |
| WO | WO 2005 107981 | 11/2005 |

* cited by examiner

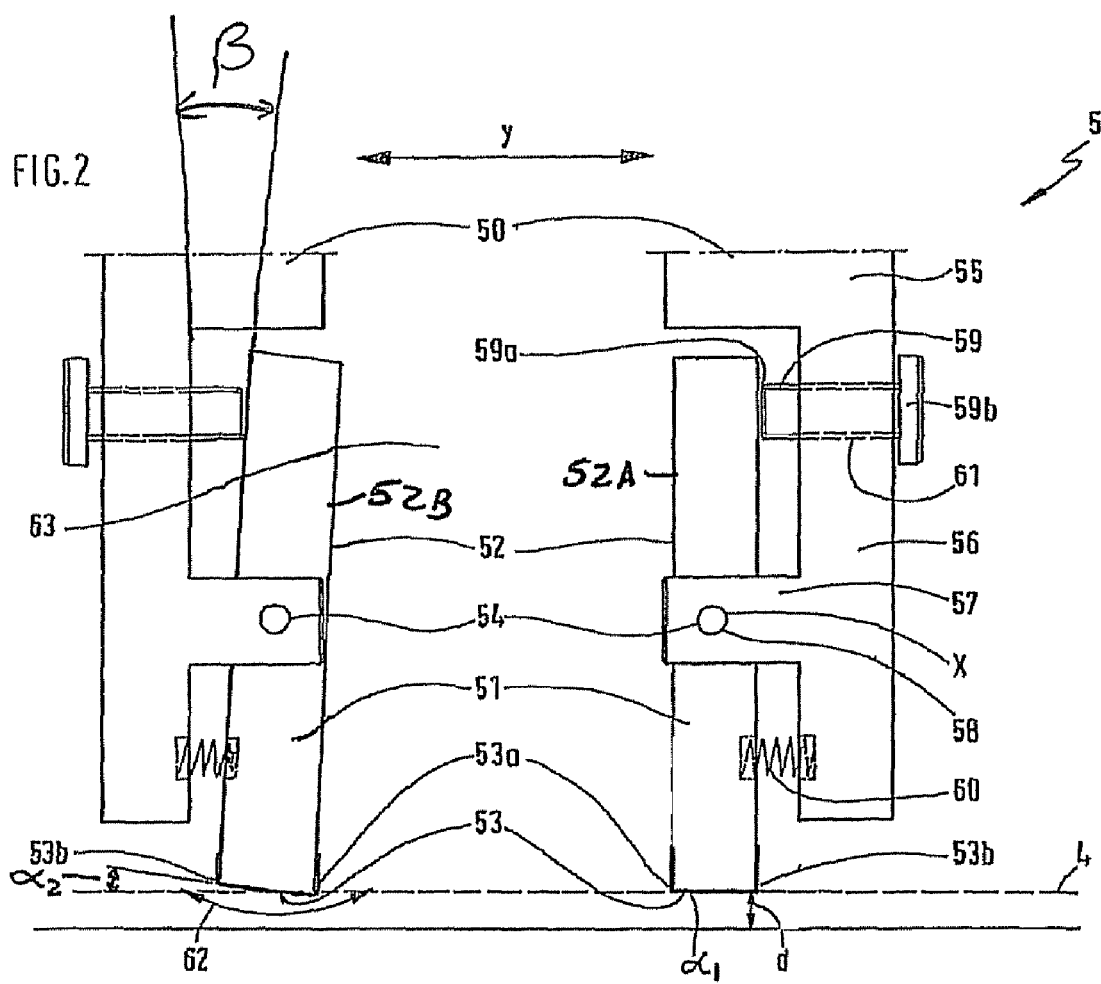

DEVICE AND METHOD FOR THE MANUFACTURING OF A THREE-DIMENSIONAL OBJECT

The present invention is related to a device and a method for manufacturing a three-dimensional object by a layerwise solidification of a building material in powder form at the positions in the respective layer that corresponds to the cross-section of the object.

From DE 195 14 740 C1 a device and a method for manufacturing a three-dimensional object by means of laser sintering are known, wherein the application and the smoothing of a layer of the building material in powder form is done by means of an application device in the form of a blade. There, each of the faces of the blade has a predetermined angle to the work plane, on which the layer of the building material is applied and the faces form an application surface that is facing the work plane.

The optimum angle for such an application surface in practice depends on various parameters, among others the layer thickness of the layer to be applied and the material properties of the building material in powder form. In the prior art for the angle of the application surface of the application device relative to the work plane an angle is chosen, that leads to acceptable results under various known and conceivable conditions. Due to such a compromise an acceptable process for the various conditions can be successfully attained. However, it may be for example the case that, when using a building material in powder form, the material properties of which do remarkably differ from the average of the conceivable materials to be used, the optimum results for the layer application cannot be achieved.

It is an object of the invention to provide a device and a method for manufacturing a three-dimensional object by a layerwise solidification of a building material in powder form, by which an improved layer application for various process parameters such as various material properties of the building materials is enabled.

The object is achieved by a device according to claim 1 and by a method according to claim 13. Further developments of the invention are characterized in the dependent claims.

The solution according to the invention has the advantage that the geometry of the application device can be adapted in a simple way to the process parameters of the manufacturing process to be carried out.

By adapting the geometry of the application device to the respective process parameters in each case an optimum layer application can be implemented over a large range of material properties and layer thicknesses and thus an improvement of the manufactured objects with respect to the surface quality and the size accuracy can be achieved. The manufacturing of three-dimensional objects with various process parameters in a short temporal sequence is enabled.

Further features and utilities of the invention result from the description of embodiments by means of the enclosed figures, of which:

FIG. 2 shows a schematic side view of an application device according to an embodiment.

Figure 1:
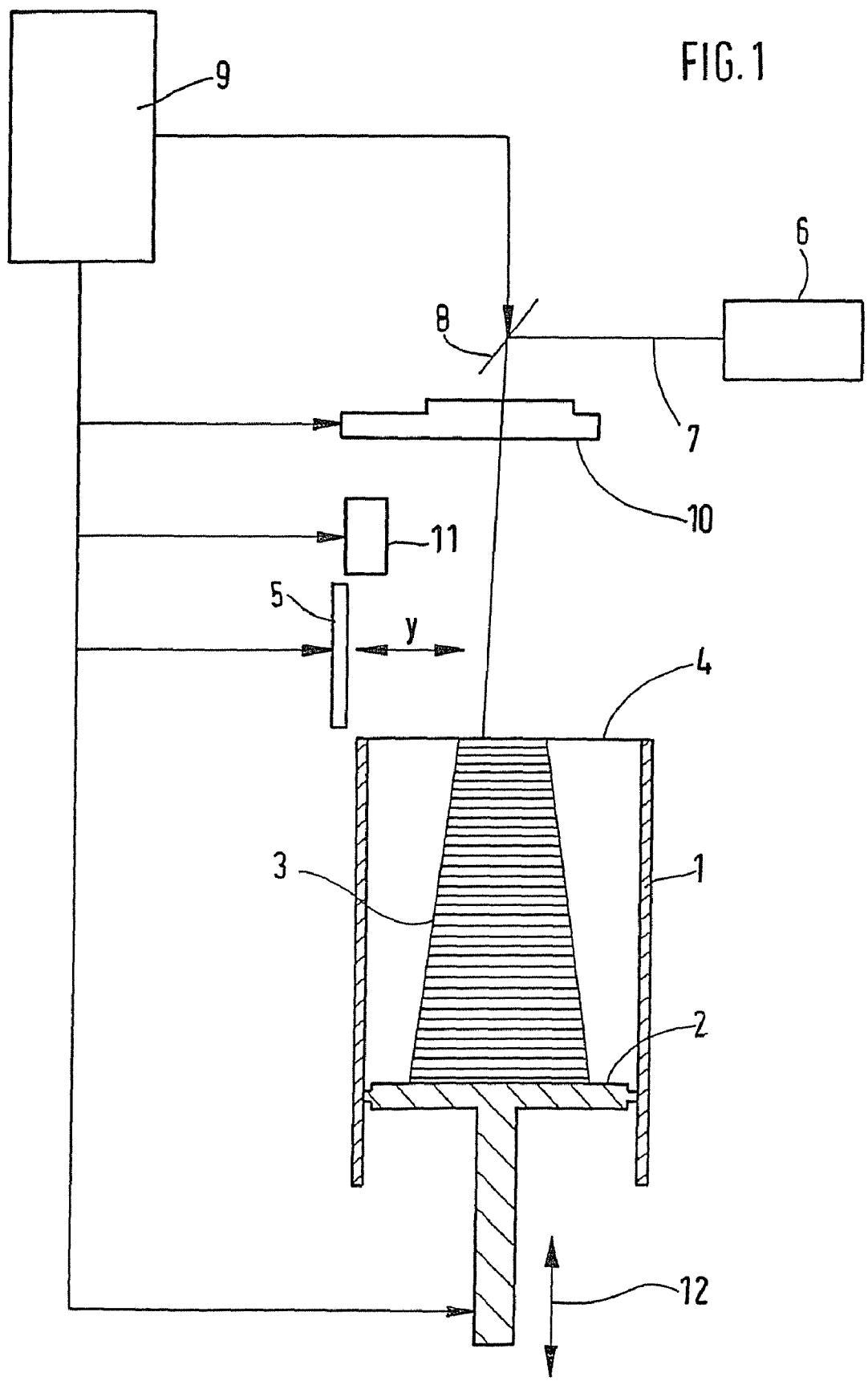
FIG. 1 shows a schematic cross-sectional view of the device.

In the following at first the whole device in a first embodiment is described with respect to FIG. 1.

As is apparent from FIG. 1, the device for manufacturing a three-dimensional object comprises a building container 1, in which a support 2 is provided having an upper side that is substantially plane and is substantially aligned in parallel to the upper edge of the building container. The support 2 is formed for supporting an object 3 to be manufactured in unsolidified building material surrounding it. In FIG. 1 the object 3 to be formed is shown, which object consists of a plurality of layers of a building material in powder form, which has been solidified at positions corresponding to the object by the action of electromagnetic radiation, as will be described in more detail later.

The support 2 can be moved in a vertical direction in the building container 1 via a height-adjustment device 12 that is schematically represented by a double arrow in FIG. 1. The plane, in which applied powder material is solidified, defines a work plane 4, in which the layer application of building material and a subsequent solidification of the building material in powder form in order to form the three-dimensional object are carried out.

Above the building container 1 a device for solidifying the material in powder form in the work plane 4 is provided. The device comprises a radiation source, e.g. in the form of a laser 6 that generates a laser beam 7. Also, above the building container 1 a deflection device 8, e.g. in the form of a deflection mirror, that can be pivoted by means of a pivoting unit that is not shown, and a focussing unit 10 are arranged. A control 9 is provided, which can drive the deflection device 8 and the focussing unit 10 such that the laser beam 7 can be directed to any position of the work plane 4.

Furthermore, above the building container 1 a supply device 11 is provided, by which the building material in powder form for a subsequent layer can be supplied. This supply device 11 is e.g. formed in the shape of a trough that is filled with the building material in powder form, which can have a dosage device by which a predetermined amount of the building material is ejected.

As is only schematically shown in FIG. 1, above the building container a spreading device in the form of an application device 5 is provided. The lower edge of the application device 5 lies in the work plane 4 and a shifting device, which is schematically shown by a horizontal double arrow, for shifting the application device 5 in a direction Y in parallel to the work plane 4 is provided. The shifting device enables a movement of the application device 5 with an adjustable variable velocity across the whole surface of the work plane 4 in the direction from left to right in FIG. 1 and back again. The application device 5 extends in the direction perpendicular to the plane of FIG. 1 substantially across the whole width of the building container 1.

The construction of the application device is described in the following in more detail based on FIG. 2.

As can be seen in FIG. 2, the application device 5 in the shown embodiment comprises two mounting portions 50 and two application portions 51, wherein these portions are symmetrically formed with respect to a vertical line to the work plane 4. Therefore, in order to simplify the description, at first only one mounting portion 50 and one application portion 51 are described. A direction of movement Y of the application device 5 runs horizontally in FIG. 2 from left to right and back again in parallel to the work plane 4.

The application portion 51 in each case consists of a thin plate or blade 52 that is substantially vertical to the work plane 4 and extends in the direction perpendicular to the plane of representation across the whole width of the work plane 4. The lower face side of the plate 52A forms an application surface 53 that is arranged in an angle $\alpha_1$ relative to the work plane (in FIG. 2: 0°, i.e. parallel alignment). The lower face side of the plate 52B forms an application surface 53 that is arranged in an angle $\alpha_2$ relative to the work plane (in FIG. 2: greater than 0°, i.e. non-parallel alignment).

Approximately at its center in the vertical direction the application portion 51 is provided with a bearing pin 54 that protrudes laterally from the plate 52 on both sides perpendicular to the plane of representation of FIG. 2. Both bearing pins 54 on opposite sides of the plate 52 define an axis of rotation X that runs in parallel to the work plane 4.

The mounting portion 50 consists in the shown embodiment of an upper massive frame 55 that connects to a vertically extending support portion 56. The support portion 56 extends laterally in the direction of the axis of rotation X at least slightly further than the plate 52 of the application portion 51. Approximately at the center of the support 56 in the vertical direction on both sides of the plate 52 a support nose 57 is formed that is running horizontally towards the other mounting portion 50. Each support nose 57 is provided with an opening 58, in which a bearing pin 54 of the application portion 51 is received.

In summary, the application portion 51 is mounted in the openings 58 of the mounting portion 50 with its both lateral a bearing pins 54 such that it can be pivoted around the axis of rotation X with respect to the mounting portion 50. Here the pivoting is effected such that the lower edges 53a and 53b of the application surface 53 are always in parallel to the work plane 4 and the angle α between the application surface 53 and the work plane 4 is varied in the pivoting. In FIG. 2 the pivoting is schematically represented by a double arrow 62 for the left application portion 51.

In order to adjust the angle α also an adjustment device is provided that is formed in the shown embodiment by an adjustment mechanism such as a set screw 59 and a reset mechanism such as a reset spring 60. The set screw 59 is screwed into a piercing threaded hole 61 that is provided in the support 56 above the support nose 57.

The front face 59a of the set screw 59 is flattened and protrudes from the support 56 in such a way that it presses against the plate 52 of the application portion 51 above the bearing pin 54. The reset spring 60 is provided below the axis of rotation X between the application portion 51 and the support 56 and presses the plate 52 by being rotated around the axis of rotation X against the front face 59a of the set screw 59.

By screwing in and out the set screw 59 the application portion 51 is pivoted against the force of the reset spring 60 around the axis of rotation X, so that the angle α between the application surface 53 and the work plane 4 is made smaller or larger. In the shown embodiment the head 59b of the set screw is shown as wheel, by which the set screw can be grasped in order to screw it in and out. For instance, a scale can be provided, by means of which the angle α can be read from the position of the head 59b of the set screw 59.

The application device 5 is made of a rigid material, in particular metal or a plastic material, and the application surface 53 is formed in the shape of a blade, as described above.

Usually the angles α of both application surfaces 53 of the left and the right application portion 51, respectively, will be adjusted to have the same value; however, the angles can also be adjusted independently from each other to have different values. In case no separate adjustment of the angles is desired, the adjustment device can also be formed such that the angles of both application surfaces 53a can be synchronously changed.

The functioning of the application device 5 will be described in the following based on FIGS. 1 and 2.

The application device 5 is located at first in a position on a side of the work plane 4 such as the left side of the work plane 4 as is schematically shown in FIG. 1. By the supply device 11 a defined amount of the building material in powder form is introduced into the region 63 between the application portions 51 of the application device 5, so that a column of the building material forms between the application portions 51. The horizontal surface of the support 2 or a previously solidified powder layer is moved by a defined distance d below the work plane 4 with the help of the height adjustment device 12. Then the application device 5 is moved with a defined velocity in the direction of movement Y across the work surface 4 and in parallel to it. The movement occurs for example at first from left to right in FIGS. 1 and 2. By the movement of the application device 5 the building material in powder form is moved under the application surface 53 on the left side of the application device 5 in FIG. 2 and this application surface smoothes the building material, so that a defined layer of the building material in powder form having a thickness corresponding to the distance d is applied on the work plane.

The arrangement of the application surface 53 such that it has an angle α causes the building material to be compacted and at the same time smoothened, when the layer is applied.

By the symmetric construction of the application device 5 having the two application portions 51 it is made possible that a layer application can occur during a movement of the application device from left to right in FIG. 2 as well as by a reverse movement from right to left in FIG. 2. In the process between both application portions 51 a powder column of the powder to be applied is formed, which enables a particular uniform and well-defined layer application in both opposite directions of movement of the application device. This construction efficiently makes possible to transport the powder material to be applied and to apply it at the same time.

The method for manufacturing of the three-dimensional object is described in the following.

In operation at first an optimum angle between the application surface 53 and the work plane 4 is determined based on a.o. the material properties of the building material and the layer thickness to be generated. This optimum angle is adjusted by means of the adjustment device, i.e. the set screw 59 in the shown embodiment.

Then, layers of the building material are applied alternatingly onto the upper side of the support 2 or on previously solidified layers by means of the application device 5 and by means of the control 9 the focussed laser beam 7 is directed onto the applied layer via the deflection device 8 and the focussing unit 10 such that the building material is sintered or solidified at the positions of the layer that correspond to the cross-section of the object. These method steps are repeated until the object to be manufactured is completed.

By the device and the method the angle of the application surface 53 relative to the work plane 4 can be accurately adjusted depending on the respective process parameters. Thus, also for unusual material properties and layer thicknesses an optimum layer application can occur and the part quality of the manufactured three-dimensional objects can be improved.

Though in the embodiment a particular design has been described, numerous modifications are possible. The device for the solidification need not necessarily be a laser, but also other sources of electromagnetic radiation or particle radiation having an energy required for the solidification of the building material are conceivable. In the described embodiment the application device is described such that in each case a lower application surface 53 is provided.

However, the application device can also be constructed e.g. in the form of a blade that is tapering towards the bottom such that the lateral face 53 forms an application surface.

The application device can also be formed as blade that has on each of its opposite sides an application surface for applying the powder material in different directions of movement.

In the shown embodiment a symmetrically constructed application device 5 is described that has two application surfaces 53, so that an application is possible in two directions of movement. However, it is also possible to apply the invention to an application device, which effects a layer application only in one direction of movement.

Also, an adjustment device has been described, in which the adjustment of the angular position of the application surface 53 is effected manually via a screw. However, also an automatic adjustment of the angular position of the application surface is possible, which can e.g. be effected via a step motor or a different motor, actuator or drive that is connected to the control 9.

A pivoting device for enabling the adjustment of the angle has been described, wherein the adjustment is effected via a screw or a reset spring. However, also other technical implementations are possible; an arrest of the connection of the mounting portion and the application portion can also occur in a friction-locking or form-locking way. Also, the adjustment of the angular position need not be effected via a bearing with a pin and openings, but also other articulated joints are possible, in which the angular position can be interlocked with a sufficient force.

The variation of the angular position need not be effected via a screw. Also, e.g. eccentrics or other adjustment mechanisms can be used.

As building material in powder form different materials such as plastic, metal, ceramics, sand, coated powder, powders having several components and combinations thereof can be used.

The inventiion claimed is:

1. Device for manufacturing a three-dimensional object by a layerwise solidification of a building material in powder form at the positions in the respective layer that correspond to the cross-section of the object to be manufactured having:
   a work plane, in which layers of the building material in powder form are successively applied and partially solidified,
   an application device that is movable across the work plane for applying a layer of the building material in the work plane, wherein the application device has a blade having an application surface facing the work plane and a mounting portion to which the blade is pivotally mounted, and,
   an adjustment device positioned to adjust an angle ($\beta$) between the blade and the mounting portion, wherein adjustment of the adjustment device changes the angle ($\alpha$) between the application surface and the work plane in the direction that the application device moves during movement of the application device over the work plane.

2. Device according to claim 1, in which the application surface is formed such that it smoothes and/or compacts the layer during the application.

3. Device according to claim 1, in which the extent of the swiveling of the mounting portion and the application portion with respect to each other is determined by the adjustment device.

4. Device according to claim 1, wherein the adjustment device has a rotary portion and a rotation of the rotary portion by a certain amount changes the angle ($\alpha$) between the application surface and the work plane at an amount, wherein the two amounts are in a fixed ratio.

5. Device according to claim 1, wherein the angular position of the angle ($\alpha$) is lockable.

6. Device according to claim 1, wherein a reset device is provided that moves the application surface by a reset force into a preset angular position.

7. Device according to claim 1, in which the application device has two application surfaces for an application in two directions that are opposite to one another, when the application device is moved, which are spaced from one another.

8. Device according to claim 2, in which the application device has two application surfaces for an application in two directions that are opposite to one another, when the application device is moved, which are spaced from one another.

9. Device according to claim 6, in which the application device has two application surfaces for an application in two directions that are opposite to one another, when the application device is moved, which are spaced from one another.

10. Device according to claim 1, wherein between the two application surfaces a region for receiving the supplied building material, which is to be applied, is provided.

11. Device according to claim 6, wherein between the two application surfaces a region for receiving the supplied building material, which is to be applied, is provided.

12. Device according to claim 1, wherein the blade has two application surfaces for applying in directions of movement of the application device that are different from one another or wherein the application device has two blades and an application surface is provided at each blade.

13. Device according to claim 1, wherein the adjustment device has a scale that indicates the preset angle between the application surface and the work plane.

14. Device according to claim 1, in which the adjustment device has a drive for adjusting the angle ($\alpha$).

15. The device of claim 1, wherein the application surface is a planar surface.

16. The device of claim 15, wherein the application surface is formed normal to first and second lower edges of the blade.

17. The device of claim 1, wherein orientation of the mounting portion relative to the work plane remains constant regardless of the angle between the application surface and the work plane.

* * * * *